(12) United States Patent
Smith et al.

(10) Patent No.: US 11,017,092 B2
(45) Date of Patent: May 25, 2021

(54) TECHNOLOGIES FOR FAST LAUNCH OF TRUSTED CONTAINERS

(71) Applicant: Intel Corporation, Santa Clara, CA (US)

(72) Inventors: Ned Smith, Beaverton, OR (US); Samuel Ortiz, Montpellier (FR); Manohar Castelino, Santa Clara, CA (US); Mikko Ylinen, Lempaala (FI)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 16/144,325

(22) Filed: Sep. 27, 2018

(65) Prior Publication Data
US 2019/0042759 A1 Feb. 7, 2019

(51) Int. Cl.
*G06F 21/57* (2013.01)
*H04L 29/06* (2006.01)
(Continued)

(52) U.S. Cl.
CPC ........ *G06F 21/575* (2013.01); *G06F 9/45558* (2013.01); *G06F 21/602* (2013.01);
(Continued)

(58) Field of Classification Search
CPC ......... H04L 63/10; G06F 21/44; G06F 21/57; G06F 21/50; G06F 21/60
See application file for complete search history.

(56) References Cited

U.S. PATENT DOCUMENTS

| 9,442,752 B1* | 9/2016 | Roth | G06F 9/45558 |
| 2019/0034617 A1* | 1/2019 | Scarlata | G06F 9/30007 |

FOREIGN PATENT DOCUMENTS

WO WO-2015171478 A1 * 11/2015 ......... G06F 9/45558

OTHER PUBLICATIONS

Yeluri et al., "Trusted Docker Containers and Trusted VMs in OpenStack," OpenStack Summit, Vancouver, May 2015, retrieved Nov. 23, 2020 from [https://01.org/sites/default/files openstacksummit_vancouver trusteddockercontainers.pdf],16 pages.
(Continued)

*Primary Examiner* — Izunna Okeke
(74) *Attorney, Agent, or Firm* — Hanley, Flight & Zimmerman, LLC

(57) ABSTRACT

Technologies for fast launch of trusted containers include a computing device having a trusted platform module (TPM). The computing device measures a container runtime with the TPM and executes the container runtime in response to the measurement. The computing device establishes a trust relationship between the TPM and a virtual platform credential, provisions the virtual platform credential to a virtual TPM, and executes a guest environment in response to provisioning the virtual platform credential. The computing device measures a containerized application with the virtual TPM and executes the containerized application in response to the measurement. The computing device may perform a trusted computing operation in the guest environment with the virtual TPM. The virtual TPM and the containerized application may be protected with multi-key total memory encryption (MKTME) support of the computing device. State of the virtual TPM may be encrypted and persisted. Other embodiments are described and claimed.

23 Claims, 7 Drawing Sheets

(51) Int. Cl.
  *G06F 21/60*   (2013.01)
  *G06F 9/455*   (2018.01)
  *G06F 21/74*   (2013.01)
(52) U.S. Cl.
  CPC .... *G06F 21/74* (2013.01); *G06F 2009/45562* (2013.01); *G06F 2009/45587* (2013.01)

(56) References Cited

OTHER PUBLICATIONS

Moran et al., "A Firmware Update Architecture for Internet of Things Devices—draft-moran-suit-architecture-03," Mar. 5, 2018, retrieved Nov. 23, 2020 from [https://tools.ietf.org/html/draft-moran-suit-architecture-03], 31 pages.

Brown, "Pros and Cons of System Update and Integrity Protection Schemes," Linux.com, Apr. 27, 2017, retrieved Nov. 23, 2020 from [https://www.linux.com/news/pros-and-cons-system-update-and-integrity-protection-schemes/], 4 pages.

* cited by examiner

TECHNOLOGIES FOR FAST LAUNCH OF TRUSTED CONTAINERS

BACKGROUND

Trusted and secure boot systems allow computing devices to verify software and firmware components as they are loaded, establishing a chain of trust for the computing device. For example, a typical secure boot system may verify boot firmware, firmware drivers, an operating system loader, and an operating system of the computing device as they are loaded. Example protected boot technologies include Intel® Trusted Execution Technology (TXT), Intel Boot Guard, UEFI Secure Boot technology, or Intel Platform Trust Technology (PTT). The root of trust for trusted boot may include, for example, a Trusted Platform Module (TPM) as specified by the Trusted Computing Group®.

Certain applications may be executed using containers, virtualization, or other resource isolation technologies. Containerized applications may be isolated from other applications using virtual machines, namespaces, or other virtualization technologies.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
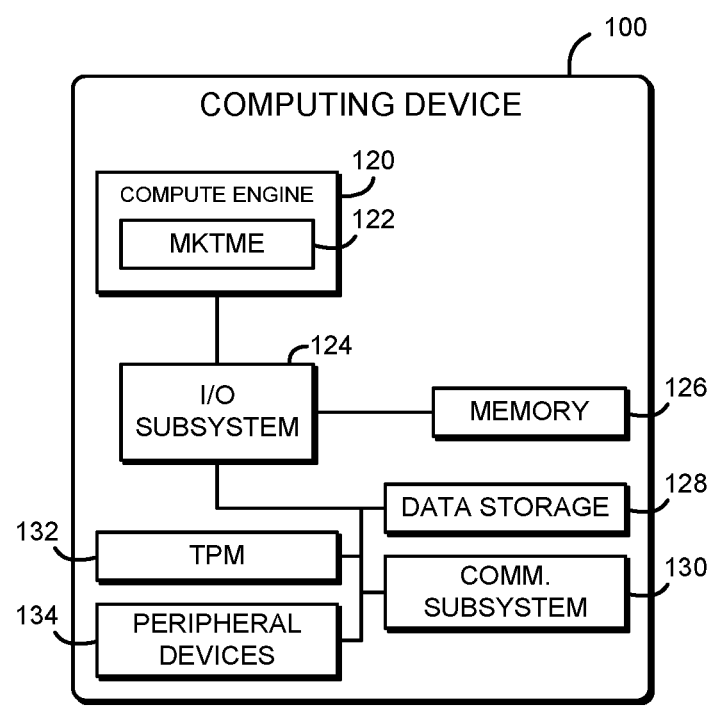
FIG. 1 is a simplified block diagram of at least one embodiment of a computing device for trusted container execution.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for trusted container execution includes a compute engine 120 and a physical trusted platform module (TPM) 132. In use, as described below, the computing device 100 performs a trusted boot process that measures platform components, extending into a container runtime. The computing device 100 sets up a virtual TPM (vTPM) in a trusted container. The trusted container executes directly from memory and can be integrity protected using a manifest that describes various container layers. The vTPM and the container memory pages may be protected using multi-key total memory encryption (MKTME) support 122 of the compute engine 120. By performing trusted computing operations with the vTPM, the computing device 100 may improve performance compared to a physical TPM 132, which may be a relatively inexpensive microcontroller with limited resources and/or may be connected to the compute engine 120 via a low-speed I/O connection. Additionally, by using a vTPM in each trusted container, the computing device 100 may be capable of scaling to handle many containers without the overhead associated with virtual machine exits and/or accesses to the physical TPM 132. Additionally, MKTME keys may be securely stored with the physical TPM 132, which may ensure security even if MKTME encrypted memory persists across power cycles, which in turn may allow for efficient re-launch of already instantiated trusted containers.

The computing device 100 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively include a compute engine 120, an input/output subsystem 124, a memory 126, a data storage device 128, a communication subsystem 130, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the compute engine 120 in some embodiments.

The compute engine 120 may be embodied as any type of compute engine capable of performing the functions described herein. For example, the compute engine 120 may be embodied as a single or multi-core processor(s), digital signal processor, microcontroller, field-programmable gate array (FPGA) or other configurable circuitry, application-specific integrated circuit (ASIC), or other processor or processing/controlling circuit. Additionally, although illustrated as including a single compute engine 120, in some embodiments the computing device 100 may be embodied as a multi-socket server with multiple processors 120. The illustrative compute engine 120 includes multi-key total memory encryption (MKTME) support 122. The MKTME support 122 allows the compute engine 120 to transparently encrypt the contents of the memory 126. The MKTME support 122 maintains a table or other internal, protected structure with multiple encryption keys, which are used to encrypt and decrypt data as it is stored to and read from the memory 126, respectively. The encryption keys are illustratively 128-bit AES XTS keys although may be embodied as any symmetric, asymmetric, or other encryption key. The encryption key may be selected by the MKTME support 122 on a per-page basis, for example based on a key identifier included in one or more otherwise unused upper bits of the physical memory page address for a particular memory access. In those embodiments, an operating system, virtual memory monitor, or other supervisory component of the computing device 100 may control access to particular memory pages by configuring one or more page tables and/or extended page tables with the appropriate key identifiers. MKTME keys may be generated by the MKTME support 122, in which case they are not disclosed outside of the compute engine 120, or may be supplied by software. In some embodiments, the MKTME support 122 may include support for Intel Trusted Domain Extensions (TDX). With TDX, the MKTME support 122 may accept an external "domain" key, also called a "user" or "tenant" key. The compute engine 120 may also use a default key that is self-generated to protect memory used by MKTME and Intel SGX as well as Intel TDX.

The memory 126 may be embodied as any type of volatile or non-volatile memory or data storage capable of performing the functions described herein. In operation, the memory 126 may store various data and software used during operation of the computing device 100 such operating systems, applications, programs, libraries, and drivers. The memory 126 is communicatively coupled to the compute engine 120 via the I/O subsystem 124, which may be embodied as circuitry and/or components to facilitate input/output operations with the compute engine 120, the memory 126, and other components of the computing device 100. For example, the I/O subsystem 124 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the compute engine 120, the memory 126, and other components of the computing device 100, on a single integrated circuit chip. Similarly, the data storage device 128 may be embodied as any type of device or devices configured for short-term or long-term storage of data such as, for example, memory devices and circuits, memory cards, hard disk drives, solid-state drives, non-volatile flash memory, or other data storage devices.

The computing device 100 also includes the communication subsystem 130, which may be embodied as any communication circuit, device, or collection thereof, capable of enabling communications between the computing device 100 and other remote devices over a computer network (not shown). The communication subsystem 130 may be embodied as any network interface card, network adapter, network controller, host fabric interface, network coprocessor, or other component that connects the computing device 100 to a computer network. The communication subsystem 130 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication. In some embodiments, the communication subsystem 130 may form a portion of an SoC and be incorporated along with the compute engine 120 and/or other components of the computing device 100 on a single integrated circuit chip.

As shown, the computing device 100 includes a TPM 132. The TPM 132 may be embodied as a physical microcontroller, coprocessor, functional block, or other dedicated component that provides security services. In particular, the TPM 132 may provide one or more secure storage locations for cryptographic keys, platform credentials, and platform measurements. The TPM 132 may also provide secure random number generation, cryptographic key generation, cryptographic binding and sealing, local or remote attestation, or other security services. The TPM 132 may be implemented according to one or more TPM standards specified by the Trusted Platform Group, such as TPM 1.2, TPM 2.0, or any other version. In some embodiments, the TPM 132 may be embodied as a dedicated microcontroller coupled to the I/O subsystem 124 via a low-bandwidth connection such as a low pin count (LPC) bus, a serial peripheral interconnect (SPI) bus, or other low-speed interconnect.

The computing device 100 may further include one or more peripheral devices 134. The peripheral devices 134 may include any number of additional input/output devices, interface devices, and/or other peripheral devices. For example, in some embodiments, the peripheral devices 134 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 2:
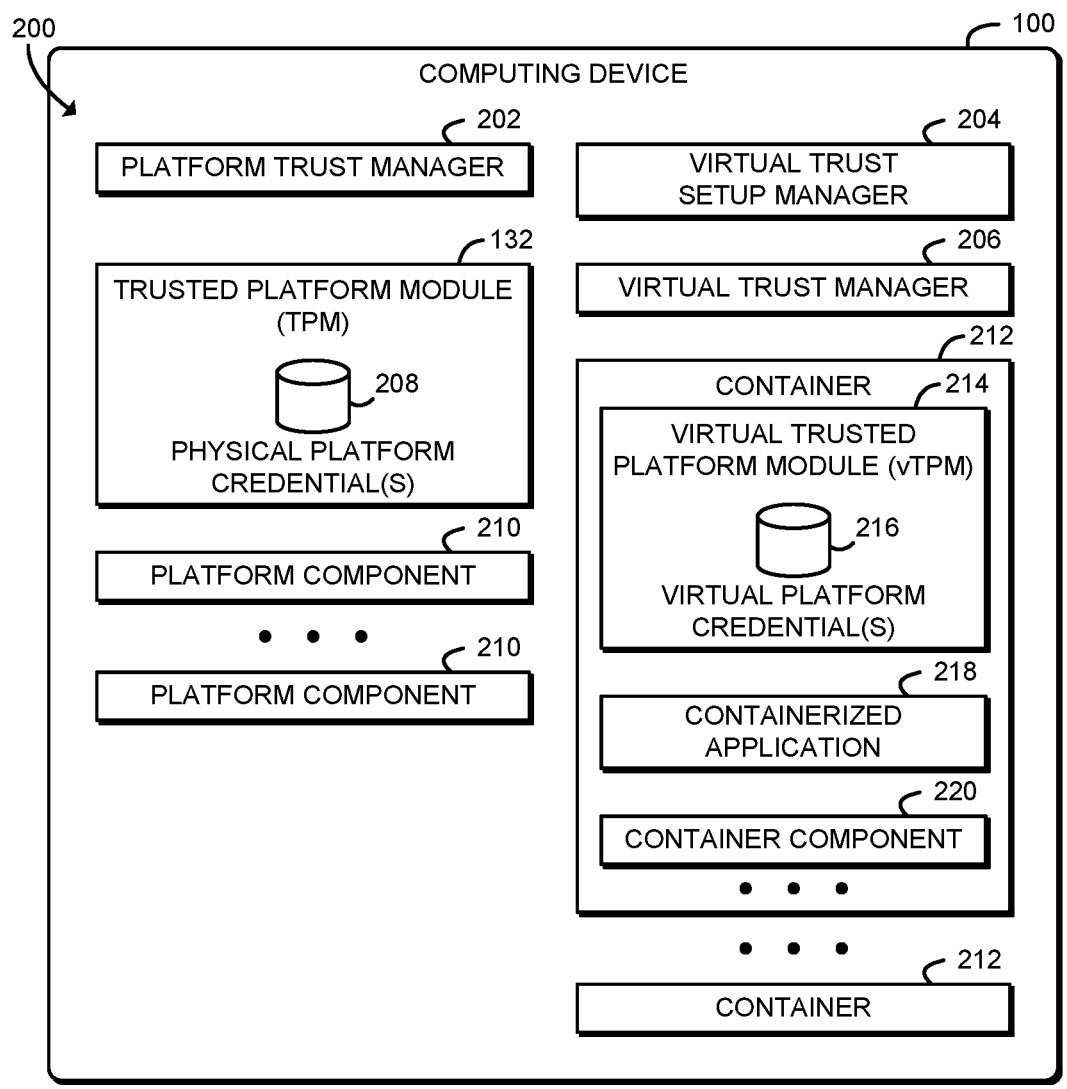
FIG. 2 is a simplified block diagram of at least one embodiment of an environment of the computing device of FIG. 1.

Referring now to FIG. 2, in an illustrative embodiment, a computing device 100 establishes an environment 200 during operation. The illustrative environment 200 includes a platform trust manager 202, a virtual trust setup manager 204, and a virtual trust manager 206. Various components or parts of components of the environment 200 may be established by or otherwise execute in a host environment or virtualized environment of the computing device 100. As shown, the various components of the environment 200 may be embodied as hardware, firmware, software, or a combination thereof. As such, in some embodiments, one or more of the components of the environment 200 may be embodied as circuitry or collection of electrical devices (e.g., platform trust manager circuitry 202, virtual trust setup manager circuitry 204, and/or virtual trust manager circuitry 206). It should be appreciated that, in such embodiments, one or more of the platform trust manager circuitry 202, the virtual trust setup manager circuitry 204, and/or the virtual trust manager circuitry 206 may form a portion of the compute engine 120, the I/O subsystem 124, and/or other components of the computing device 100. For example, circuitry of the compute engine 120 may load or otherwise execute instructions to establish the platform trust manager 202, the virtual trust setup manager 204, and/or the virtual trust manager 206. Additionally, in some embodiments, one or more of the illustrative components may form a portion of another component and/or one or more of the illustrative components may be independent of one another.

As shown, the environment 200 further includes multiple platform components 210 and containers 212. As described further below, the platform components 210 may include firmware (e.g., hardware boot executive ROM, UEFI BIOS), low-level software (e.g., boot loader), operating system components, container runtime components, and other executable components of the computing device 100. Each container 212 may include a virtual TPM (vTPM) 214, a containerized application 218, and other container components 220, such as containerized virtual machines, operating systems, middleware, and/or other containerized components.

The platform trust manager 202 is configured to measure the platform components 210 with the TPM 132 and to execute the platform components 210 in response to measuring them. As described further below, to establish a chain of trust, a stack of platform components 210 from the initial hardware boot executive component 210 to the container runtime component 210 may be measured using the TPM 132 and executed.

The virtual trust setup manager 204 is configured to establish trust relationships between the TPM 132 and one or more virtual platform credentials 216 in response to executing the container runtime component 210 and to provision the virtual platform credentials 216 to the vTPM 214 of each container 212. Establishing the trust relationship may include generating a virtual endorsement key of the vTPM 214 using the TPM 132. The virtual trust setup manager 204 is further configured to execute a guest environment of the container 212 in response to provisioning the virtual platform credentials 216. The virtual platform credentials 216 may include one or more keys, certificates, device identities, manifest structures, or other trusted computing infrastructure structures. For example, the virtual platform credentials 216 may include a virtual endorsement certificate and a virtual platform certificate. The virtual platform credentials 216 may be pre-loaded into a filesystem image resident in memory, which may improve launch speed without sacrificing security.

The virtual trust manager 206 is configured to, in response to execution of a guest environment of a container 212, measure the containerized application 218 and container components 220 of the container 212 with the vTPM 214. The virtual trust manager 206 is further configured to execute the containerized application 218 and the container components 220 in the guest environment in response to measuring the containerized application 218 and the container components 220. The virtual trust manager 206 may be further configured to perform a trusted computing operation in the guest environment with the vTPM 214 in response to executing the containerized application 218. In some embodiments, the vTPM 214 and the containerized application 218 may be executed in isolated sub-containers of the container 212.

In some embodiments, the virtual trust setup manager 204 may be further configured to configure the MKTME support 122 of the compute engine 120 with one or more encryption keys. The virtual trust setup manager 204 may set a policy for which a default key may be used or many tenant or domain keys may be used. The virtual trust setup manager 204 may be further configured to establish a trust relationship between the TPM 132 and one or more of the MKTME encryption keys. In some embodiments, the virtual trust setup manager 204 may be configured to securely store one or more MKTME encryption keys using the TPM 132. The virtual trust manager 206 may be further configured to encrypt memory pages associated with the vTPM 214 with an MKTME encryption key and to encrypt memory pages associated with the containerized application 218 with a different MKTME encryption key. The virtual trust manager 206 may be further configured to encrypt a trust state of the vTPM 214 with the corresponding MKTME encryption key to generate an encrypted trust state and to store the encrypted trust state in a persistent storage of the computing device 100. The virtual trust setup manager 204 may further set a policy for which processor instructions are used to protect memory containing the vTPM 214 and general-purpose containers, as well as a policy for whether or not a VM or VMM is further used to protect the container (vTPM or general-purpose).

The virtual trust manager 206 may be further configured to establish a trust relationship between the vTPM 214 and a container manifest in response to executing the guest environment of the container 212. The container manifest includes an integrity measurement of the containerized application 218 and/or one or more container components 220. In those embodiments, measuring the containerized application 218 may include returning the integrity measurement of the containerized application 218 from the container manifest.

Figure 3:
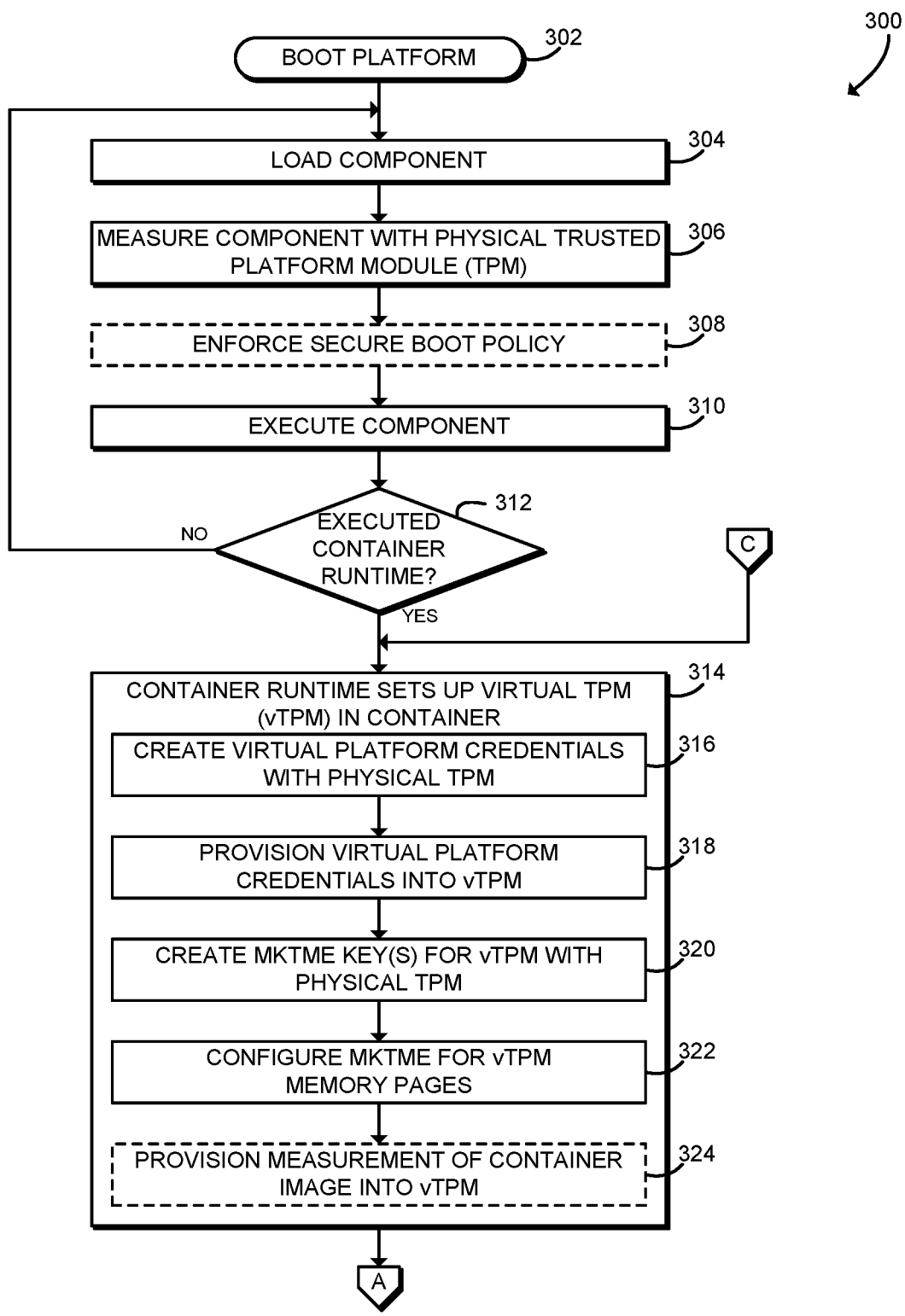
FIGS. 3-5 are a simplified flow diagram of at least one embodiment of a method for trusted container execution that may be executed by the computing device of FIGS. 1-2.
Figure 4:
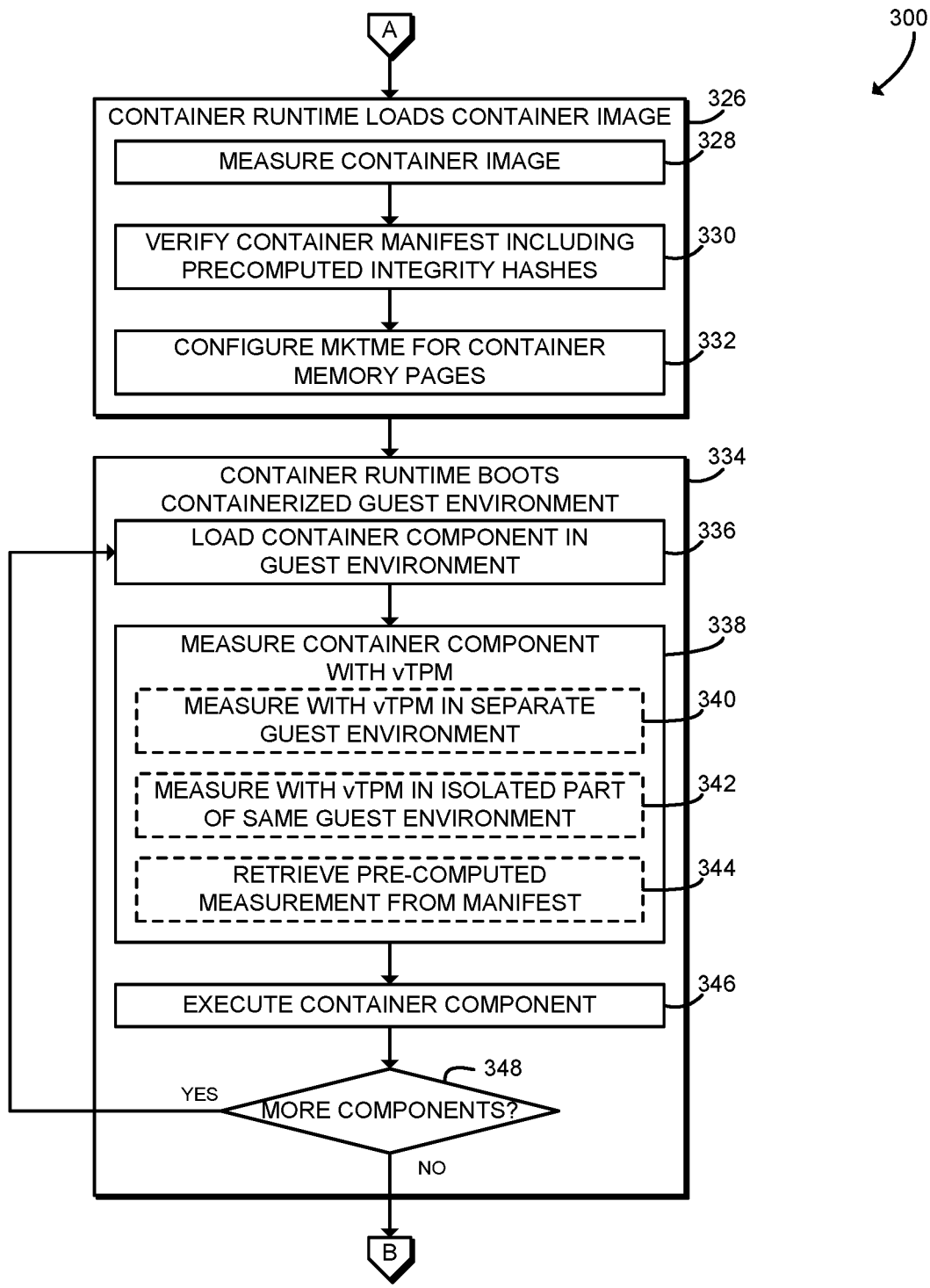
Figure 5:
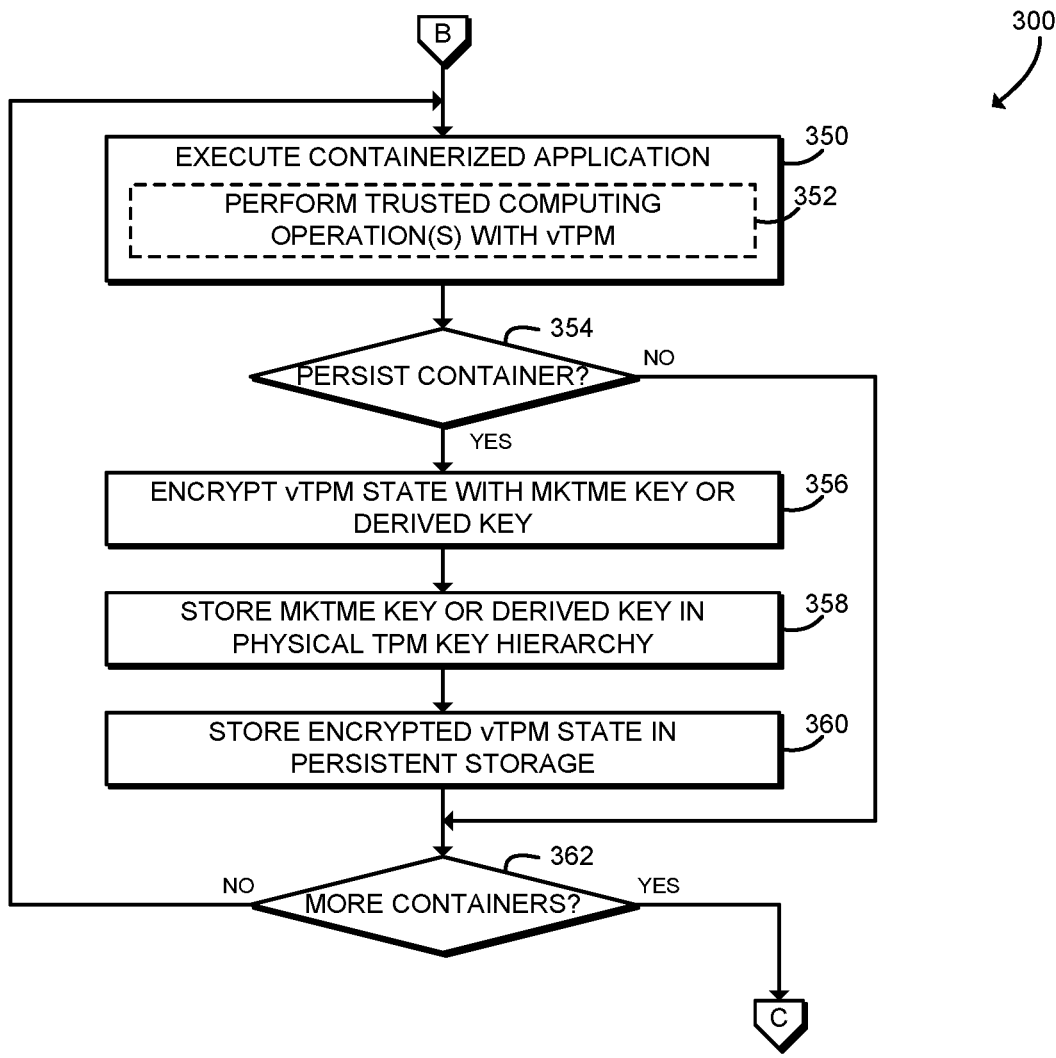

Referring now to FIGS. 3-5, in use, the computing device 100 may execute a method 300 for trusted container execution. It should be appreciated that, in some embodiments, the operations of the method 300 may be performed by one or more components of the environment 200 of the computing device 100 as shown in FIG. 2. The method 300 begins in block 302, shown in FIG. 3, in which the computing device 100 performs a platform boot. The computing device 100 may boot in response to a power cycle event, platform reset, or other boot event. In response to the platform boot, the computing device 100 may start a trusted boot process, for example using Intel TXT. As described above, as part of the trusted boot process, the compute engine 120 may load or otherwise execute instructions to establish the platform trust manager 202, the virtual trust setup manager 204, and/or the virtual trust manager 206.

Figure 6:
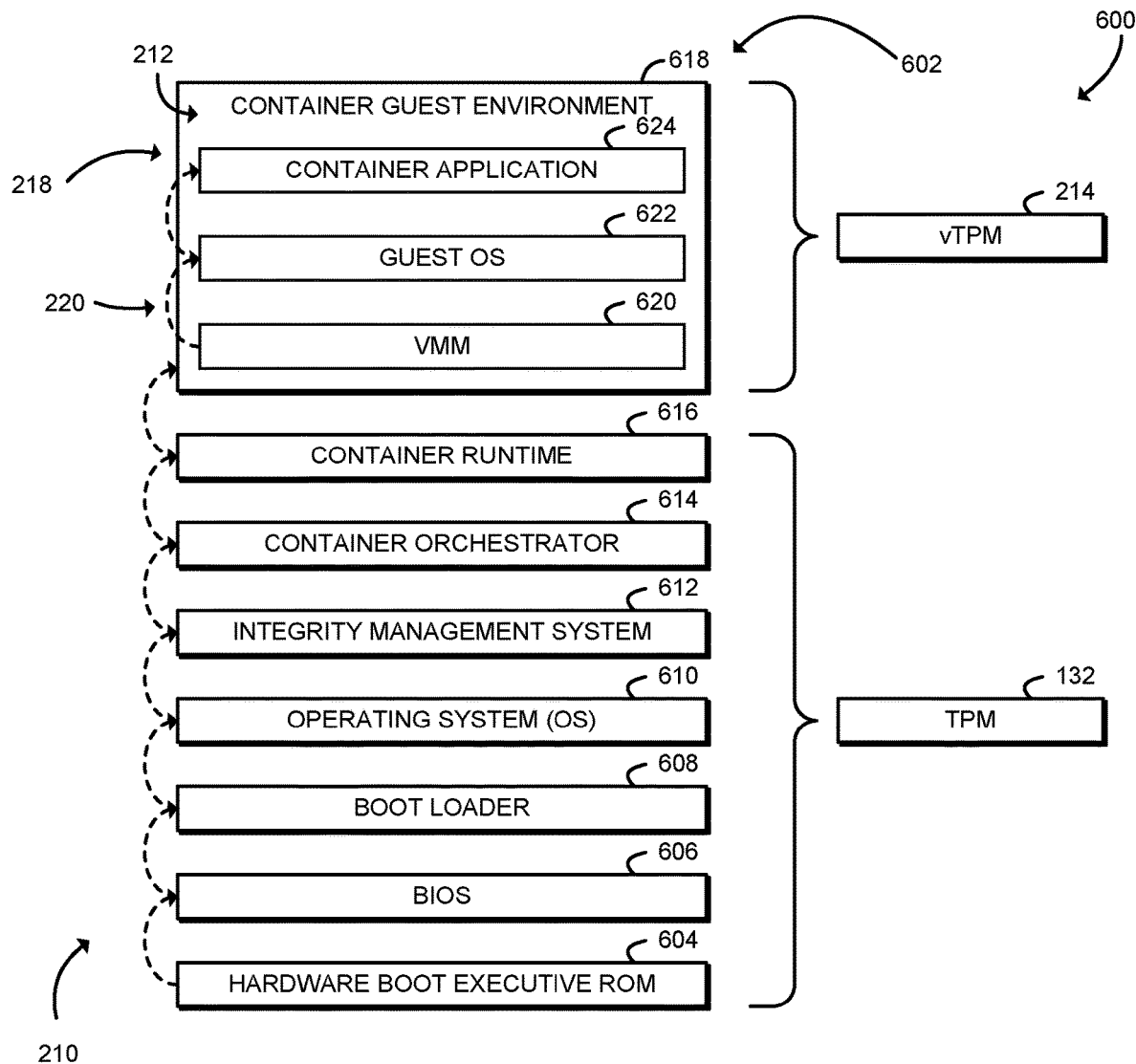
FIG. 6 is a simplified block diagram of at least one embodiment of a trusted component stack of the computing device of FIGS. 1-2.

In block 304, the computing device 100 loads a platform component 210. The platform component 210 may be loaded, for example, from a firmware device, data storage device 128, or other nonvolatile storage into the memory 126. The computing device 100 may initially load a low-level platform component such as a hardware boot executive ROM and may continue loading higher layers of a system component stack. One potential embodiment of an illustrative component stack is illustrated in FIG. 6 and described below.

In block 306, the computing device 100 measures the platform component 210 using the physical TPM 132. The computing device 100 may, for example, calculate an integrity hash of the platform component 210 and extend a platform configuration register (PCR) of the physical TPM 132 with that integrity hash.

In some embodiments, in block 308 the computing device 100 may enforce a secure boot policy. For example, the computing device 100 may compare an integrity hash of the platform component 210 to a whitelist of allowed components. If the platform component 210 is not included in the whitelist, the computing device 100 may perform a security action such as halting the platform.

In block 310, after measuring the platform component 210 and in some embodiments enforcing the secure boot policy, the computing device 100 executes the platform component 210. As described further, after being executed, the platform component 210 may load, measure, and execute the next component 210 in the component stack.

In block 312, the computing device 100 determines whether a container runtime component 210 has been loaded, measured, and executed. The container runtime component 210 manages execution of one or more containers 212 including establishing a guest container environment for each container 212. The container runtime component 210 may be embodied as or otherwise include a virtual machine monitor, a hypervisor, a namespace or other operating-system-level virtualization component, and/or other container runtime and orchestration tools. For example, the container runtime component 210 may be embodied as Kubernetes, Kata Containers, Clear Containers, Docker, OpenStack, OpenShift, or other container runtime. The container runtime component 210 may use virtualization support of the compute engine 120 to enforce isolation between containers 212, such as Intel VT-x or other virtualization support. If the container runtime component 210 has not yet been executed, the method 300 loops back to block 304 to continue loading, measuring, and executing platform components 210. If the container runtime component 210 has been executed, the method 300 advances to block 314.

In block 314, the container runtime component 210 of the computing device 100 sets up a virtual TPM (vTPM) 214 in a container 212. During container setup, the vTPM 214 may be loaded into memory 126, such as into a memory filesystem or ISO image. As described further below, the container 212 may include at least two memory pages, each being associated with different MKTME keys. For example, one MKTME key may be associated with vTPM 214 memory page(s) and another MKTME key may be associated with non-TPM container 212 layers (e.g., container components 220 and the container application 218). The vTPM 214 MKTME key may be obtained from processor-generated MKTME keys. The container runtime component 210 may supply a guest-vTPM specific key used to protect the remaining container 212 pages. In some embodiments, the vTPM 214 may also contain the container 212 MKTME key, or a storage key derived from the MKTME key that may be used to protect other data that is exclusively bound to the container.

In block 316, the computing device 100 creates one or more virtual platform credentials 216 with the physical TPM 132. In particular, the vTPM 214 may be constructed with keys specified by an applicable TPM specification. For example, the vTPM 214 environment may be dynamically constructed when the container 212 is initialized for the first time. The container runtime component 210 (and/or other container orchestration tools) may perform one or more virtual manufacturing processes to create virtual platform credentials 216, such as a virtual storage root key (SRK), virtual endorsement key, virtual attestation key, virtual device identity key, and/or other keys and credentials specified by the appropriate TPM specification. The virtual platform credentials 216 may be signed or otherwise authenticated by the TPM 132. For example, the virtual platform credentials 216 of the vTPM 214 may be included in a key hierarchy of the physical TPM 132. In that example, the virtual SRK may be stored under the physical SRK of the TPM 132. The physical TPM 132 may act as the manufacturer and issuer of the vTPM 214. The certificates chain of the TPM 132 may be extended to include the vTPM 214 and end entity certificates. The virtual attestation key of the vTPM 214 (e.g., IAK/LAK) may be used to issue/sign a container manifest structure associated with the container 212. As described further below in connection with FIG. 7, the container manifest describes container layers and may include intermediate hash values. In block 318, the computing device 100 provisions the virtual platform credentials 216 to the vTPM 214. For example, the virtual platform credentials 216 may be stored in a filesystem image resident in memory or other in-memory image of the vTPM 214.

In block 320, the computing device 100 creates one or more MKTME encryption keys for the vTPM 214 with the physical TPM 132. The MKTME encryption keys may be included in a key hierarchy of the TPM 132 with appropriate key constraints as defined by applicable TPM specifications. In block 322, the computing device 100 configures the MKTME support 122 of the compute engine 120 to perform encryption of one or more vTPM 214 memory pages using the MKTME encryption key(s). Encrypting the vTPM 214 memory pages may protect secure storage of the vTPM 214 (e.g., a key hierarchy, registers, and other secure storage) from unauthorized disclosure to the guest environment of the container 212 and/or other components of the computing device 100.

In some embodiments, in block 324, the computing device 100 may provision one or more measurements of the container 212 image into the vTPM 214. For example, TPM state data such as one or more pre-measured virtual platform configuration register (PCR) values may be provisioned to the vTPM 214. The provisioned measurements may be stored in a filesystem image resident in memory or other in-memory image of the vTPM 214.

Figure 7:
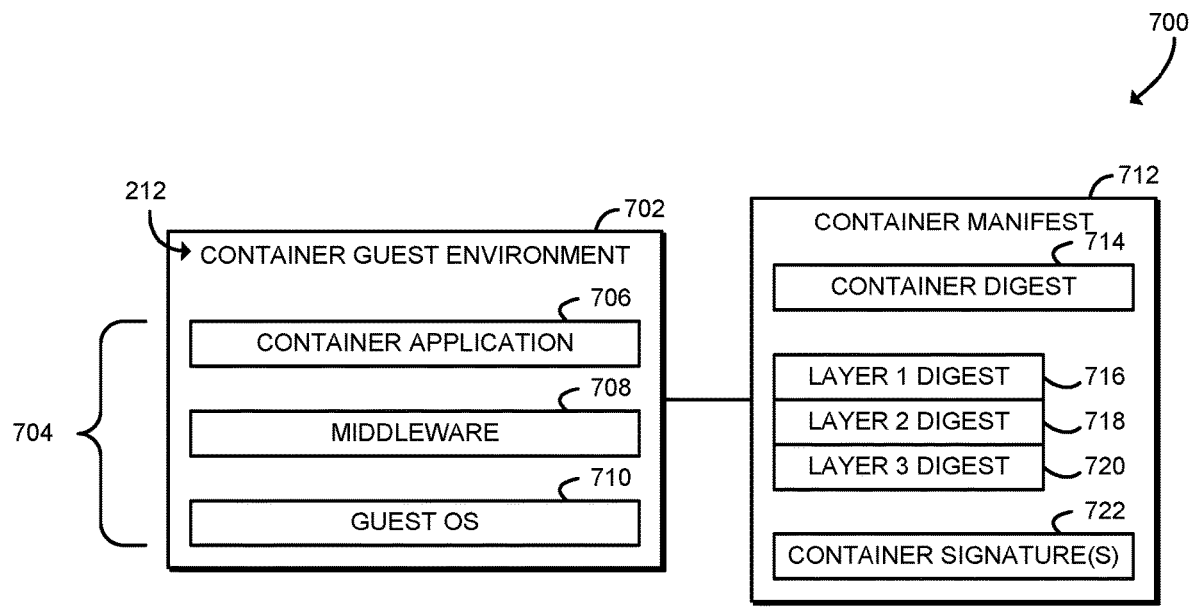
FIG. 7 is a simplified block diagram of at least one embodiment of a container manifest of the computing device of FIGS. 1-2.

Referring now to FIG. 4, after setting up the vTPM 214, in block 326 the container runtime component 210 of the computing device 100 loads the container 212 image. In block 328, the computing device 100 measures the container 212 image. For example, the computing device 100 may determine integrity hashes for one or more layers included in the container 212 image and/or the entire container 212 image. In block 330, the computing device 100 verifies a container manifest, platform certificate, and/or other data that includes one or more precomputed integrity hashes. The container manifest may be included in an image of the container 212, such as an in-memory filesystem image. One potential embodiment of a container manifest is shown in FIG. 7 and described below.

In block 332, the computing device 100 configures the MKTME support 122 of the compute engine 120 to perform encryption of one or more container 212 memory pages with associated MKTME encryption key(s). Encrypting the container 212 memory pages may protect the containerized application 218 and/or container components 220 from unauthorized disclosure and/or modification by other components of the computing device 100 (e.g., other containers 212). The MKTME encryption keys for the container 212 memory pages may be created by the vTPM 214 and included in a key hierarchy of the vTPM 214. The container 212 memory pages may be encrypted with different MKTME keys from those used to encrypt the vTPM 214 memory pages, which may provide additional isolation between the vTPM 214 and other components of the container 212.

Figure 8:
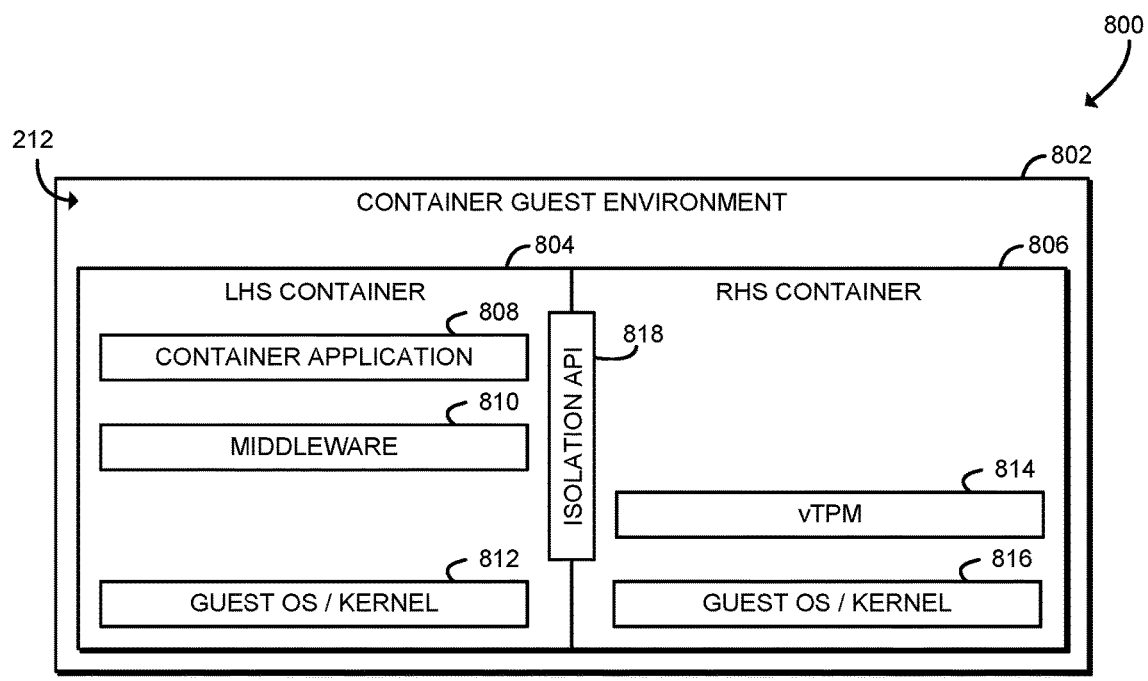
FIG. 8 is a simplified block diagram of at least one embodiment of a container guest environment of the computing device of FIGS. 1-2.

In block 334, the container runtime component 210 of the computing device 100 boots the container 212 guest environment. The container 212 guest environment may perform a virtual trusted boot process, similar to the physical trusted boot process described above in connection with blocks 304 to 310. In block 336, the computing device 100 loads a container component 220 in the guest environment. In block 338, the computing device 100 measures the container component 220 with the vTPM 214. The computing device 100 may, for example, calculate an integrity hash of the container component 220 and extend a platform configuration register (PCR) of the vTPM 214 with that integrity hash. In some embodiments, in block 340, the computing device 100 performs the measurement with a vTPM 214 in a separate guest environment from the container component 220. For example, the vTPM 214 may be executed in a second container 212, a nested container 212, or other separate guest environment, such as an SGX enclave, a service VM (SOS), an Intel TDX environment, or in the VMM/hypervisor. In some embodiments, in block 342 the computing device 100 performs the measurement with a vTPM 214 in an isolated part of the same guest environment as the container component 220. For example, the container component 220 and the vTPM 214 may be included in different sub-containers of the container 212. Each sub-container may be assigned to a virtual partition of the guest environment, for example by assigning different virtual processors to each sub-container. One potential embodiment of isolated sub-containers is illustrated in FIG. 8 and described below.

In some embodiments, in block 344 the computing device 100 may retrieve a pre-computed measurement from a container manifest. For example, as described above, a container 212 image may include a container manifest, platform certificate, and/or other data that includes pre-computed integrity hash values. After being verified and loaded into memory, MKTME encryption may protect the manifest and source images from unauthorized modification. Thus, specific layers and/or components of the container 212 may be subsequently verified using integrity hash values included in the manifest.

In block 346, the computing device 100 executes the container component 220. In block 348, the computing device 100 determines whether additional container components 220 remain to be loaded, measured, and executed. If so, the method 300 loops back to block 336. If no additional container components 220 remain, the method 300 advances to block 350, shown in FIG. 5.

Referring now to FIG. 5, in block 350 the computing device 100 executes the containerized application 218 within the guest environment of the container 212. In some embodiments, in block 352 the computing device 100 may perform one or more trusted computing operations with the vTPM 214. For example, the containerized application 218 may perform attestation or verification to an onboarding or orchestration utility using the vTPM 214 or otherwise access security services provided by the vTPM 214. The containerized application 218 may access trusted computing services according to one or more applicable TPM specifications, for example by accessing standard libraries or other middleware (e.g., a Trusted Software Stack (TSS) as specified by the Trusted Computing Group). The containerized application 218 may further manage application-specific cryptographic keys using the vTPM 214 interface without special containerization or virtualization awareness. The computing device 100 may perform the trusted operations by the vTPM 214 within the guest environment, without requiring a virtual machine exit or other context switch to a host environment or other non-containerized environment of the computing device 100, and without requiring involvement of the physical TPM 132. Thus, the computing device 100 may perform trusted computing operations that have relatively high performance (e.g., performing operations at memory speed) and that are scalable to support many containers 212.

In block 354, the computing device 100 determines whether to persist the container 212 across container execution cycles. If not, the method 300 branches ahead to block 362, described below. If the computing device 100 determines to persist the container 212, the method 300 advances to block 356.

In block 356, the computing device 100 encrypts vTPM 214 state using the MKTME associated with the vTPM 214 or using a derived storage key. For example, the vTPM 214 may generate a storage key for this purpose under its virtual storage root key (vSRK). The vTPM 214 state that is encrypted may include platform configuration registers (PCRs), virtual platform credentials 216, a key hierarchy, or other secure storage of the vTPM 214. In block 358, the computing device 100 stores the MKTME key (or derived key) into the key hierarchy of the physical TPM 132. For example, the TPM 132 may bind, seal, or otherwise protect the MKTME key with one or more keys already included in the key hierarchy of the physical TPM 132. As another example, a derived storage key may be stored under the vSRK in the key hierarchy of the TPM 132. In block 360, the computing device 100 stores the encrypted vTPM 214 state in persistent storage of the computing device 100, such as the data storage device 128. The encrypted vTPM 214 state may be stored in unsecured storage of the computing device 100.

In block 362, the computing device 100 determines whether to load, measure, and execute additional containers 212. If not, the method 300 loops back to block 350 to continue executing the currently executing containerized application(s) 218. If the computing device 100 determines to load, measure, and execute additional containers 212, the method 300 loops back to block 314, shown in FIG. 3.

It should be appreciated that, in some embodiments, the method 300 may be embodied as various instructions stored on a computer-readable media, which may be executed by the compute engine 120 and/or other components of the computing device 100 to cause the computing device 100 to perform the method 300. The computer-readable media may be embodied as any type of media capable of being read by the computing device 100 including, but not limited to, the memory 126, the data storage device 128, firmware devices, microcode, other memory or data storage devices of the computing device 100, portable media readable by a peripheral device 134 of the computing device 100, and/or other media.

Referring now to FIG. 6, diagram 600 illustrates a component stack 602 that may be loaded, measured, and executed by the computing device 100. As shown, the stack 602 includes platform components 210 that are measured by the physical TPM 132 and a container 212. The container 212 includes a containerized application 218 and container components 220 that are measured by the vTPM 214. As described above in FIGS. 3-5, each platform component 210 of the component stack 602 loads, measures, and then executes the next platform component 210 in the component stack 602, up to a container runtime component 210.

The illustrative platform components 210 include a hardware boot executive ROM 604, which may be the first component executed by the computing device 100 after a platform reset. The hardware boot executive ROM 604 loads the BIOS 606, which is illustrated as a UEFI BIOS 606, but may be embodied as any pre-boot firmware environment. The BIOS 606 loads a boot loader 608, which is illustratively tboot, and which may be embodied as any bootloader capable of performing a measured and verified launch of an operating system or VMM. The boot loader 608 loads an operating system 610. The operating system 610 is illustratively Linux®, although in other embodiments may be another operating system such as Microsoft® Windows™. The operating system 610 loads an integrity management system 612. The integrity management system 612 oversees installation and loading of software modules that may receive an execution thread from the operating system 610. The integrity management system 612 may be embodied as Linux Integrity Measurement Architecture (IMA)/Extended Verification Module (EVM), dm-verity, Mender.io, OSTree, swupd, swupdate, or other integrity management tools. The integrity management system 612 loads a container orchestrator 614 and a container runtime 616. The container orchestrator 614 may be embodied as a Kubernetes orchestrator and/or other orchestration tools. The container runtime 616 may be embodied as a Kubernetes, Kata Containers, Clear Containers, Docker, OpenStack, OpenShift, or other container runtime. As shown, the components 604 to 616 are measured by the physical TPM 132.

The container runtime 616 loads, measures, and executes the container guest environment 618 of a container 212. As described above in connection with FIGS. 3-5, the container guest environment 618 performs a virtual boot process, and each container component 220 of the guest environment 618 loads, measures, and executes the next container component 220, up to the container application 218.

The illustrative container components 220 include a VMM 620, which is illustratively QEMU. In other embodiments the VMM 620 may be embodied as a constrained variety of QEMU otherwise referred to as NEMU. The VMM 620 may provide virtualized hardware or other services for the container 212, including in some embodiments performing operations of the vTPM 214. The VMM 620 loads a guest OS 622, which is illustratively Linux, although may be embodied as another operating system such as Microsoft® Windows™. The guest OS 622 may include TPM drivers, a Trusted System Stack (TSS) library, and/or other trusted computing support components. The guest OS 622 loads the containerized application 624. As shown, the components 620 to 624 are measured by the vTPM 214.

Referring now to FIG. 7, diagram 700 illustrates a container manifest 712 that may be associated with a container 212. As shown, the container 212 establishes a container guest environment 702, which includes a guest OS 710 (e.g., guest OS kernel, device drivers, and/or other OS components), middleware 708 (e.g., libraries, frameworks, system utilities, and/or other middleware), and a containerized application 706. The container guest environment 702 is illustratively organized into three layers 704.

The container manifest 712 includes multiple integrity hash values, including a container digest 714 and layer digests 716, 718, 720. The container digest 714 may be an integrity hash value associated with the container 212 image. Each layer digest 716, 718, 720 may be an integrity hash value associated with a corresponding layer 704 of the guest environment 702. Illustratively, the layer 1 digest 716 corresponds to the containerized application 706, the layer 2 digest 718 corresponds to the middleware 708, and the layer 3 digest 720 corresponds to the guest OS 710. It should be understood that in other embodiments the container manifest 712 may include a different number and/or organization of integrity hashes. The container manifest 712 also includes one or more container signatures 722. The container 212 may be signed, for example, using one or more virtual platform credentials 216 of the corresponding vTPM 214.

Referring now to FIG. 8, diagram 800 illustrates a container guest environment 802 with multiple isolated sub-containers 804, 806. In some embodiments, the sub-containers 804, 806 may be embodied as a left-hand side (LHS) container 804 and a right-hand side (RHS) container 806. As shown, the LHS container 804 may include a containerized application 808, middleware 810, and a LHS guest OS 812. RHS container 806 may include a vTPM 814 and a RHS guest OS 816. The sub-containers 804, 806 may communicated through a defined isolation application programming interface (API) 818. The sub-containers 804, 806 may be isolated using one or more virtualization or other resource isolation techniques.

Additionally, in some embodiments, the RHS container 806 may have additional isolation properties. For example, the memory pages of the RHS container 806 may be hidden from peer guest containers (and only exposed to the LHS container 804). The RHS container 806 may further be isolated using Intel Software Guard Extensions (SGX), Intel TDX, ARM® TrustZone®, an ACRN hypervisor containing a VM having a trusted world and an untrusted world using a virtual CPU, distinct EPTs, and separate task scheduling, or other technology. In some embodiments, the RHS container 806 may have exclusive access to secure hardware, such as the physical TPM 132, a manageability engine (ME), a converged security and manageability engine (CSME), Intel Dynamic Application Loader (DAL), a hardware security module, and/or a cryptographic accelerator such as Intel QuickAssist Technology (QAT). Memory pages of the RHS container 806 may be encrypted with MKTME keys that are independent of application-supplied keys and independent of peer-RHS container MKTME keys.

EXAMPLES

Illustrative examples of the technologies disclosed herein are provided below. An embodiment of the technologies may include any one or more, and any combination of, the examples described below.

Example 1 includes a computing device for trusted container execution, the computing device comprising: a processor; a trusted platform module; and a memory device comprising a plurality of instructions stored thereon that, in response to being executed, cause the computing device to establish a platform trust manager, a virtual trust setup manager, and a virtual trust manager; wherein: the platform trust manager is to (i) measure a container runtime component with the trusted platform module of the computing device, and (ii) execute the container runtime component in response to a measurement of the container runtime component; the virtual trust setup manager to (i) establish a trust relationship between the trusted platform module and a virtual platform credential in response to execution of the container runtime component, (ii) provision the virtual platform credential to a virtual trusted platform module of a first container in response to establishment of the trust relationship, and (iii) execute a guest environment of the first container in response to a provisioning of the virtual platform credential; and the virtual trust manager to (i) measure a containerized application of the first container with the virtual trusted platform module in response to execution of the guest environment and (ii) execute the containerized application in the guest environment in response to a measurement of the containerized application.

Example 2 includes the subject matter of Example 1, and wherein the virtual trust manager is further to perform a trusted computing operation in the guest environment with the virtual trusted platform module in response to execution of the containerized application.

Example 3 includes the subject matter of any of Examples 1 and 2, and wherein the virtual trust manager is further to: encrypt a first memory page associated with the virtual trusted platform module with a first encryption key using multi-key total memory encryption support of a processor of the computing device; and encrypt a second memory page associated with the containerized application with a second encryption key using the multi-key total memory encryption of the processor.

Example 4 includes the subject matter of any of Examples 1-3, and wherein: the virtual trust setup manager is further to configure the processor with the first encryption key and the second encryption key in response to the execution of the container runtime component; and to execute the guest environment comprises to execute the guest environment in response to configuration of the processor.

Example 5 includes the subject matter of any of Examples 1-4, and wherein the virtual trust setup manager is further to establish a trust relationship between the trusted platform module and the first encryption key.

Example 6 includes the subject matter of any of Examples 1-5, and wherein: the virtual trust setup manager is further to securely store the first encryption key with the trusted platform module; and the virtual trust manager is further to (i) encrypt a trust state of the virtual trusted platform module with the first encryption key to generate an encrypted trust state in response to execution of the containerized application, and (ii) store the encrypted trust state in a persistent storage of the computing device.

Example 7 includes the subject matter of any of Examples 1-6, and wherein to establish the trust relationship comprises to generate a virtual endorsement key of the virtual trusted platform module with the trusted platform module.

Example 8 includes the subject matter of any of Examples 1-7, and wherein to execute the guest environment comprises to: execute the virtual trusted platform module in a first sub-container of the first container; execute the containerized application in a second sub-container of the first container; and isolate the first sub-container from the second sub-container.

Example 9 includes the subject matter of any of Examples 1-8, and wherein the virtual trust manager is further to establish a trust relationship between the virtual trusted platform module and a container manifest in response to execution of the guest environment, wherein the container manifest includes an integrity measurement of the containerized application.

Example 10 includes the subject matter of any of Examples 1-9, and wherein to measure the containerized application comprises to return the integrity measurement of the containerized application from the container manifest.

Example 11 includes a method for trusted container execution, the method comprising: measuring, by a computing device, a container runtime component with a trusted platform module of the computing device; executing, by the computing device, the container runtime component in response to measuring the container runtime component; establishing, by the computing device, a trust relationship between the trusted platform module and a virtual platform credential in response to executing the container runtime component; provisioning, by the computing device, the virtual platform credential to a virtual trusted platform module of a first container in response to establishing the trust relationship; executing, by the computing device, a guest environment of the first container in response to provisioning the virtual platform credential; measuring, by the computing device, a containerized application of the first container with the virtual trusted platform module in response to executing the guest environment; and executing, by the computing device, the containerized application in the guest environment in response to measuring the containerized application.

Example 12 includes the subject matter of Example 11, and further comprising performing, by the computing device, a trusted computing operation in the guest environment with the virtual trusted platform module in response to executing the containerized application.

Example 13 includes the subject matter of any of Examples 11 and 12, and further comprising: encrypting, by the computing device, a first memory page associated with the virtual trusted platform module with a first encryption key using multi-key total memory encryption support of a processor of the computing device; and encrypting, by the computing device, a second memory page associated with the containerized application with a second encryption key using the multi-key total memory encryption of the processor.

Example 14 includes the subject matter of any of Examples 11-13, and further comprising establishing, by the computing device, a trust relationship between the trusted platform module and the first encryption key.

Example 15 includes the subject matter of any of Examples 11-14, and further comprising: securely storing, by the computing device, the first encryption key with the trusted platform module; encrypting, by the computing device, a trust state of the virtual trusted platform module with the first encryption key to generate an encrypted trust state in response to executing the containerized application; and storing, by the computing device, the encrypted trust state in a persistent storage of the computing device.

Example 16 includes the subject matter of any of Examples 11-15, and wherein establishing the trust relationship comprises generating a virtual endorsement key of the virtual trusted platform module with the trusted platform module.

Example 17 includes the subject matter of any of Examples 11-16, and further comprising establishing, by the computing device, a trust relationship between the virtual trusted platform module and a container manifest in response to executing the guest environment, wherein the container manifest includes an integrity measurement of the containerized application.

Example 18 includes one or more computer-readable storage media comprising a plurality of instructions stored thereon that, in response to being executed, cause a computing device to: measure a container runtime component with a trusted platform module of the computing device; execute the container runtime component in response to measuring the container runtime component; establish a trust relationship between the trusted platform module and a virtual platform credential in response to executing the container runtime component; provision the virtual platform credential to a virtual trusted platform module of a first container in response to establishing the trust relationship; execute a guest environment of the first container in response to provisioning the virtual platform credential; measure a containerized application of the first container with the virtual trusted platform module in response to executing the guest environment; and execute the containerized application in the guest environment in response to measuring the containerized application.

Example 19 includes the subject matter of Example 18, and further comprising a plurality of instructions stored thereon that, in response to being executed, cause a computing device to perform a trusted computing operation in the guest environment with the virtual trusted platform module in response to executing the containerized application.

Example 20 includes the subject matter of any of Examples 18 and 19, and further comprising a plurality of instructions stored thereon that, in response to being executed, cause a computing device to: encrypt a first memory page associated with the virtual trusted platform module with a first encryption key using multi-key total memory encryption support of a processor of the computing device; and encrypt a second memory page associated with the containerized application with a second encryption key using the multi-key total memory encryption of the processor.

Example 21 includes the subject matter of any of Examples 18-20, and further comprising a plurality of instructions stored thereon that, in response to being executed, cause a computing device to establish a trust relationship between the trusted platform module and the first encryption key.

Example 22 includes the subject matter of any of Examples 18-21, and further comprising a plurality of instructions stored thereon that, in response to being executed, cause a computing device to: securely store the first encryption key with the trusted platform module; encrypt a trust state of the virtual trusted platform module with the first encryption key to generate an encrypted trust state in response to executing the containerized application; and store the encrypted trust state in a persistent storage of the computing device.

Example 23 includes the subject matter of any of Examples 18-22, and wherein to establish the trust relationship comprises to generate a virtual endorsement key of the virtual trusted platform module with the trusted platform module.

Example 24 includes the subject matter of any of Examples 18-23, and wherein to execute the guest environment comprises to: execute the virtual trusted platform module in a first sub-container of the first container; execute the containerized application in a second sub-container of the first container; and isolate the first sub-container from the second sub-container.

Example 25 includes the subject matter of any of Examples 18-24, and further comprising a plurality of instructions stored thereon that, in response to being executed, cause a computing device to establish a trust relationship between the virtual trusted platform module and a container manifest in response to executing the guest environment, wherein the container manifest includes an integrity measurement of the containerized application.

The invention claimed is:

1. A computing device for trusted container execution, the computing device comprising:
a processor;
a trusted platform module; and
memory including a plurality of instructions that, in response to being executed, cause the computing device to establish a platform trust manager, a virtual trust setup manager, and a virtual trust manager,
the platform trust manager to (i) measure a container runtime component with the trusted platform module of the computing device, and (ii) execute the container runtime component in response to a measurement of the container runtime component;
the virtual trust setup manager to (i) establish a trust relationship between the trusted platform module and a virtual platform credential in response to execution of the container runtime component, and (ii) provision the virtual platform credential to a virtual trusted platform module of a first container in response to establishment of the trust relationship; and
the virtual trust manager to (i) measure a containerized application of the first container with the virtual trusted platform module in response to execution of a guest environment of the first container, (ii) execute the containerized application in the guest environment in response to a measurement of the containerized application, (iii) encrypt a first memory page associated with the virtual trusted platform module with a first encryption key using multi-key total memory encryption support of the processor of the computing device, and (iv) encrypt a second memory page associated with the containerized application with a second encryption key using the multi-key total memory encryption support of the processor,
the virtual trust setup manager to (i) configure the processor with the first encryption key and the second encryption key in response to the execution of the container runtime component, and (ii) execute the guest environment of the first container in response to: (a) a provisioning of the virtual platform credential and (b) configuration of the processor.

2. The computing device of claim 1, wherein the virtual trust manager is to perform a trusted computing operation in the guest environment with the virtual trusted platform module in response to execution of the containerized application.

3. The computing device of claim 1, wherein the virtual trust setup manager is to establish a trust relationship between the trusted platform module and the first encryption key.

4. The computing device of claim 1, wherein:
the virtual trust setup manager is to securely store the first encryption key with the trusted platform module; and
the virtual trust manager is to (i) encrypt a trust state of the virtual trusted platform module with the first encryption key to generate an encrypted trust state in response to execution of the containerized application, and (ii) store the encrypted trust state in a persistent storage of the computing device.

5. The computing device of claim 1, wherein to establish the trust relationship includes to generate a virtual endorsement key of the virtual trusted platform module with the trusted platform module.

6. The computing device of claim 1, wherein to execute the guest environment includes to:
execute the virtual trusted platform module in a first sub-container of the first container;
execute the containerized application in a second sub-container of the first container; and
isolate the first sub-container from the second sub-container.

7. The computing device of claim 1, wherein the virtual trust manager is to establish a trust relationship between the virtual trusted platform module and a container manifest in response to execution of the guest environment, the container manifest to include an integrity measurement of the containerized application.

8. The computing device of claim 7, wherein to measure the containerized application includes to return the integrity measurement of the containerized application from the container manifest.

9. A method for trusted container execution, the method comprising:
measuring, by a computing device, a container runtime component with a trusted platform module of the computing device;
executing, by the computing device, the container runtime component in response to measuring the container runtime component;
establishing, by the computing device, a trust relationship between the trusted platform module and a virtual platform credential in response to executing the container runtime component;
provisioning, by the computing device, the virtual platform credential to a virtual trusted platform module of a first container in response to establishing the trust relationship;
measuring, by the computing device, a containerized application of the first container with the virtual trusted platform module in response to executing a guest environment of the first container;
executing, by the computing device, the containerized application in the guest environment in response to measuring the containerized application;
encrypting, by the computing device, a first memory page associated with the virtual trusted platform module with a first encryption key using multi-key total memory encryption support of a processor of the computing device;
encrypting, by the computing device, a second memory page associated with the containerized application with a second encryption key using the multi-key total memory encryption support of the processor;
configuring, by computing device, the processor with the first encryption key and the second encryption key in response to the execution of the container runtime component; and
executing the guest environment of the first container in response to: (a) provisioning the virtual platform credential and (b) configuration of the processor.

10. The method of claim 9, further including performing, by the computing device, a trusted computing operation in the guest environment with the virtual trusted platform module in response to executing the containerized application.

11. The method of claim 9, further including establishing, by the computing device, a trust relationship between the trusted platform module and the first encryption key.

12. The method of claim 9, further including:
securely storing, by the computing device, the first encryption key with the trusted platform module;
encrypting, by the computing device, a trust state of the virtual trusted platform module with the first encryption key to generate an encrypted trust state in response to executing the containerized application; and
storing, by the computing device, the encrypted trust state in a persistent storage of the computing device.

13. The method of claim 9, wherein establishing the trust relationship includes generating a virtual endorsement key of the virtual trusted platform module with the trusted platform module.

14. The method of claim 9, further including establishing, by the computing device, a trust relationship between the virtual trusted platform module and a container manifest in response to executing the guest environment, the container manifest including an integrity measurement of the containerized application.

15. At least one storage device or at least one storage disk comprising a plurality of instructions stored thereon that, in response to being executed, cause a computing device to:
measure a container runtime component with a trusted platform module of the computing device;
execute the container runtime component in response to measuring the container runtime component;
establish a trust relationship between the trusted platform module and a virtual platform credential in response to executing the container runtime component;
provision the virtual platform credential to a virtual trusted platform module of a first container in response to establishing the trust relationship;
measure a containerized application of the first container with the virtual trusted platform module in response to executing a guest environment of the first container;
execute the containerized application in the guest environment in response to measuring the containerized applications;
encrypt a first memory page associated with the virtual trusted platform module with a first encryption key using multi-key total memory encryption support of a processor of the computing device;
encrypt a second memory page associated with the containerized application with a second encryption key using the multi-key total memory encryption support of the processor;
configure the processor with the first encryption key and the second encryption key in response to the execution of the container runtime component; and
execute the guest environment of the first container in response to: (a) provisioning the virtual platform credential and (b) configuration of the processor.

16. The at least one storage device or at least one storage disk of claim 15, wherein the instructions are to cause the computing device to perform a trusted computing operation in the guest environment with the virtual trusted platform module in response to executing the containerized application.

17. The at least one storage device or at least one storage disk of claim 15, wherein the instructions are to cause the computing device to establish a trust relationship between the trusted platform module and the first encryption key.

18. The at least one storage device or at least one storage disk of claim 15, wherein the instructions are to cause the computing device to:
- securely store the first encryption key with the trusted platform module;
- encrypt a trust state of the virtual trusted platform module with the first encryption key to generate an encrypted trust state in response to executing the containerized application; and
- store the encrypted trust state in a persistent storage of the computing device.

19. The at least one storage device or at least one storage disk of claim 15, wherein to establish the trust relationship includes to generate a virtual endorsement key of the virtual trusted platform module with the trusted platform module.

20. The at least one storage device or at least one storage disk of claim 15, wherein the instructions are to cause the computing device to execute the guest environment by:
- executing the virtual trusted platform module in a first sub-container of the first container;
- executing the containerized application in a second sub-container of the first container; and
- isolating the first sub-container from the second sub-container.

21. The at least one storage device or at least one storage disk of claim 15, wherein the instructions are to cause the computing device to establish a trust relationship between the virtual trusted platform module and a container manifest in response to executing the guest environment, the container manifest to include an integrity measurement of the containerized application.

22. The computing device of claim 1, wherein the trusted platform module is implemented by a microcontroller.

23. The computing device of claim 1, wherein the trusted platform module includes logic circuitry.

* * * * *